(12) United States Patent
Nagashima et al.

(10) Patent No.: US 6,196,625 B1
(45) Date of Patent: Mar. 6, 2001

(54) SLIDING ROOF APPARATUS

(75) Inventors: Youji Nagashima, Toyota; Kenji Maeta, Kariya; Kenichi Fukura; Akira Matsuura, both of Toyota; Takashi Yoshie, Aichi-ken; Yasuo Oyama, Nagoya; Masaji Ishikawa, Toyoake, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/280,087

(22) Filed: Mar. 29, 1999

(30) Foreign Application Priority Data

Mar. 31, 1998 (JP) .................................................. 10-101837

(51) Int. Cl.$^7$ ...................................................... B60J 7/00
(52) U.S. Cl. ...................................... 296/213; 296/216.08
(58) Field of Search ............................... 296/213, 216.06, 296/216.08; 52/11

(56) References Cited

U.S. PATENT DOCUMENTS

| | | | |
|---|---|---|---|
| 3,611,731 | * | 10/1971 | Edmondson ............................ 52/11 |
| 5,046,779 | * | 9/1991 | Ichinose et al. ................. 296/213 X |
| 5,332,282 | * | 7/1994 | Maeda et al. ........................ 296/213 |

FOREIGN PATENT DOCUMENTS

| | | |
|---|---|---|
| 6-144014 | 5/1994 | (JP) . |
| 6-336119 | 12/1994 | (JP) . |

* cited by examiner

*Primary Examiner*—Dennis H. Pedder
(74) *Attorney, Agent, or Firm*—Burns, Doane, Swecker & Mathis, LLP

(57) ABSTRACT

The invention improves a connection portion between a guide rail and a front rail in a sliding roof apparatus and make a mounting operation easy. In the sliding roof apparatus, a gutter is supported to a protruding portion of the guide rail, a side end portion of the front rail is overlapped with a front portion of the gutter from the above, an opening thereof is opposed to a bottom wall of the gutter, and a bracket of the side end portion is fixed to the protruding portion of the guide rail.

7 Claims, 7 Drawing Sheets

SLIDING ROOF APPARATUS

BACKGROUND OF THE INVENTION

The invention relates to a sliding roof apparatus for opening and closing an opening of a vehicle roof, and more particularly to a sliding roof apparatus having an improved connection portion between a guide rail and a front rail.

A sliding roof apparatus for vehicles is structured, as shown in FIG. 7, such that guide rails 6 and 6 are arranged in both sides of an opening 2 provided in a roof 1 of the vehicle in the longitudinal direction thereof, front slide members 4 and 4 and rear shoes 5 and 5 are connected to a slide panel 3, generally a transparent material such as a glass. The shoes 5 and 5 are moved forward and backward along guide rails 6 and 6 via a cable by a motor 7 and the slide panel 3 is moved to an illustrated position or a rear portion of the opening 2, thereby closing and opening the opening 2. The guide rails 6 and 6 used for the sliding roof apparatus is fixed and supported to a vehicle structure by using a housing and has gutters for treating a rain water, and the gutters discharge water out of the vehicle via water discharge passages 8 and 8.

The gutter is formed in a housing extending to a side portion from a lower portion of the guide rail or integrally formed with the guide rail, as disclosed in Japanese Patent Laid-Open Publication No. Hei 6-144014 (1994) or Japanese Patent Laid-Open Publication No. Hei 6-336119 (1994). Further, it is structured such that the gutter having a substantially U-shaped cross section and separately formed from the guide rail is mounted on a protruding or extending portion formed in a side outer portion of the guide rail. In the manner mentioned above, the gutter provided in the side of the guide rail is matched to the rail gutter portion in the front rail and a seal member is interposed in the matched portion so as to achieve the gutter without a water leakage.

It is a bad operability to connect the front rail and the guide rail by using the seal member so as to communicate between the rail gutter portions of both rails, so that an improvement thereof is desired. Further, known means for providing the gutter in the housing that does not require the seal member, however, enlarges the housing, and makes it hard to mount it.

SUMMARY OF THE INVENTION

An object of the invention is to solve the problems in the prior art mentioned above.

In order to solve the problem mentioned above, the invention basically employs technical conception for mounting a gutter having a pipe for connecting a drain hose at front and rear ends in an outer side of each of right and left guide rails for slidably supporting a slide panel and fixing both ends of a front rail having a function of a rain gutter to the guide rail so as to arrange the both ends on the right and left gutters.

In accordance with the technical conception mentioned above, since it is not necessary to integrally form or connect in a sealing manner both ends of the rain gutter portion in the front rail with the right and left gutter, an operability is improved, so that a cost can be widely reduced. Further, since the right and left gutters are respectively fixed to the guide rails and it is not necessary to have a function as the frame, a freedom for selecting a material is high. Since the front rail is separately formed from the right and left gutters, it is possible to form iron materials, so that a high rigidity can be secured by a small cross section and a thin structure in comparison with a resin housing.

In particular, in accordance with the invention, there is provided a sliding roof apparatus comprising:

a pair of guide rails arranged in both sides of a roof opening of a vehicle and in a longitudinal direction of the vehicle and having a protruding portion protruding to a side outer portion in an outer side surface thereof;

gutters having a substantially U-shaped cross section and supported to the protruding portion of the guide rail; and front rails arranged so as to connect front portions of the pair of guide rails and supporting a drive mechanism for the sliding roof, wherein the front rail has a rain gutter portion and the rain gutter portion is communicated with the gutter by overlapping both of the right and left end portions of the front rail with the front portion of the gutter from the above.

DESCRIPTION OF THE PREFERRED EMBODIMENTS

Figure 1:
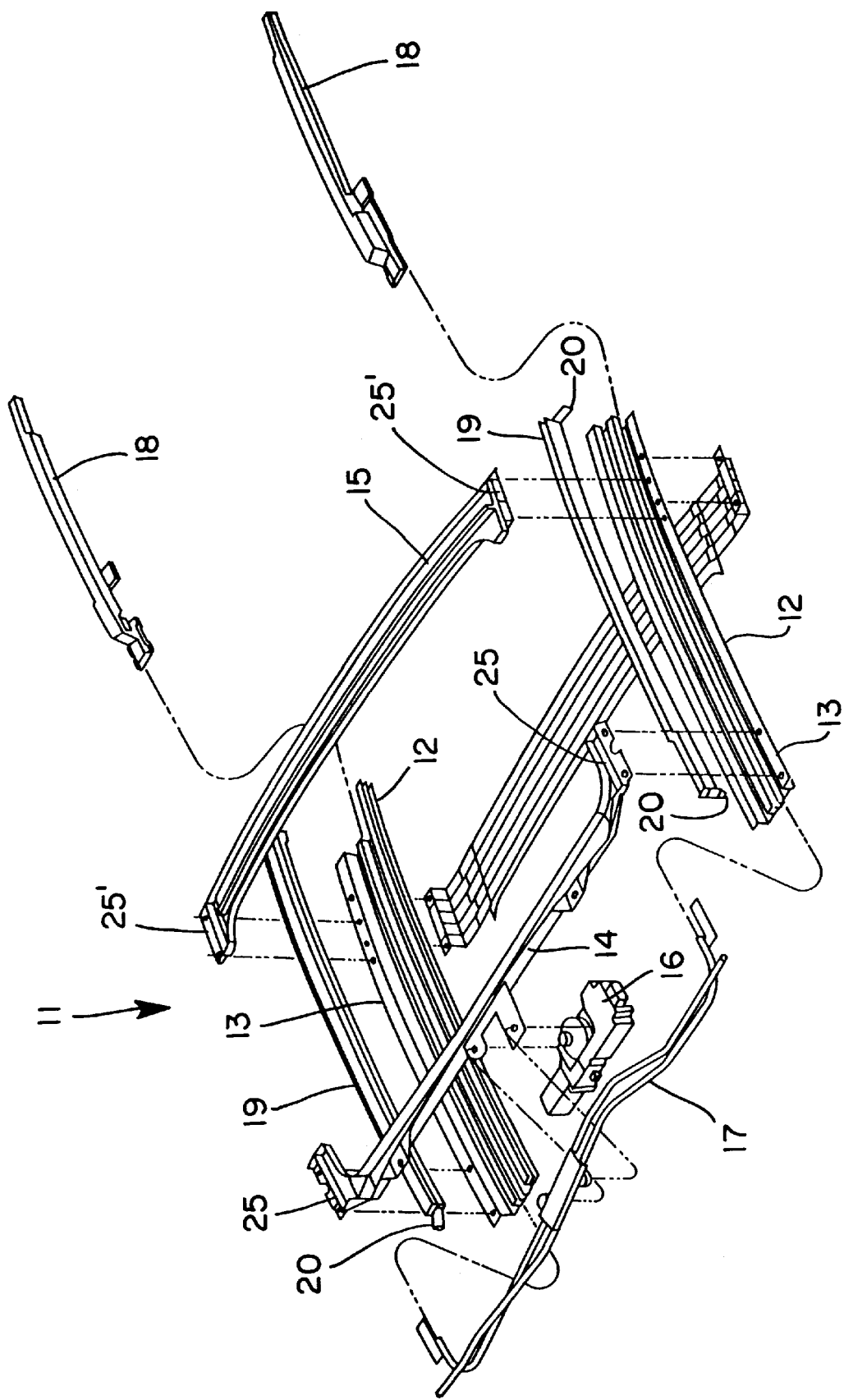
FIG. 1 is an exploded perspective view of a sliding roof apparatus in accordance with an embodiment of the invention.
Figure 7:
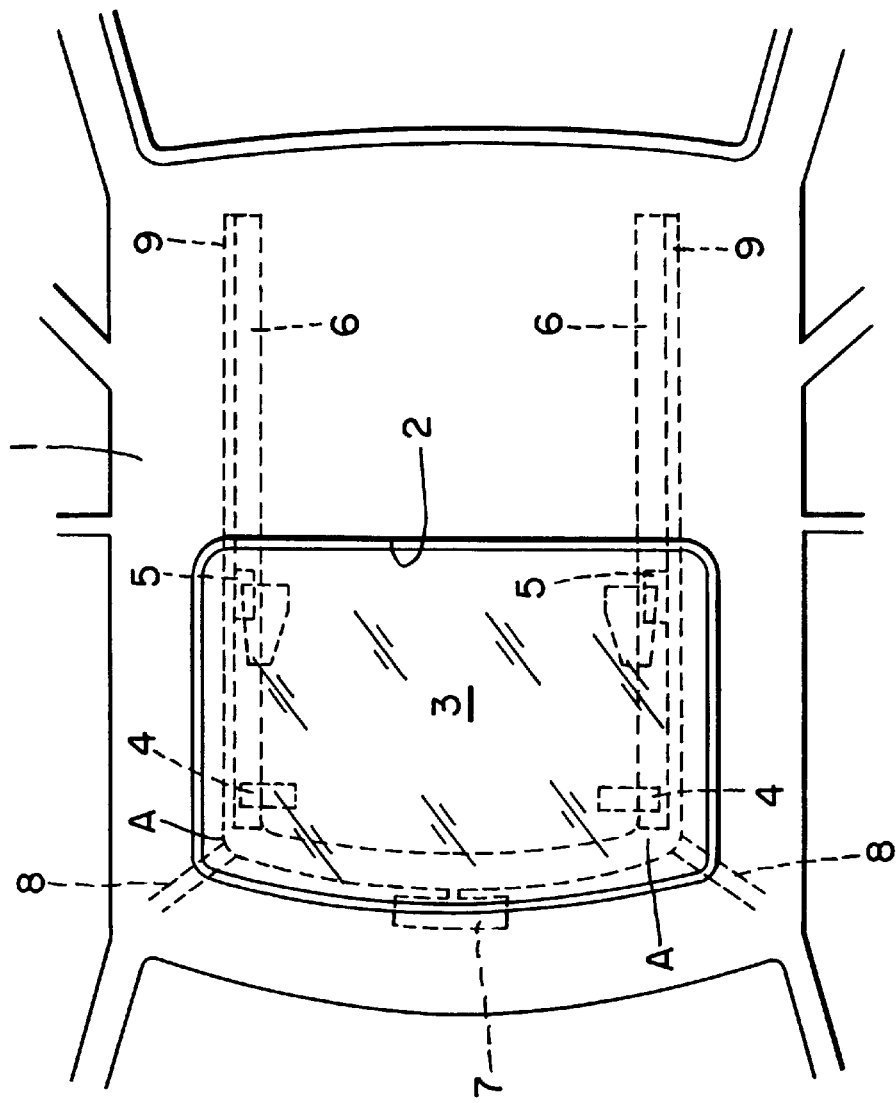
FIG. 7 is a plan view which shows a conventional embodiment.

As shown in FIG. 1, a sliding roof apparatus 11 is provided with a pair of guide rails 12 and 12 which each is arranged in a side portion of an opening of a roof for vehicles and have protruding portion 13 extending outwardly from the side portion of the guide rail 12, a front rail 14 having both ends connected to front end portions of the guide rails 12 and 12, and a rear rail 15 having both ends connected to rear end portions of the guide rails 12 and 12. A motor 16 for reciprocating a slide panel (denoted by reference numeral 3 in FIG. 7) and a drive mechanism comprising a cable apparatus 17 are fixed to the front rail 14. Cables of the cable apparatus 17 slide in the guide rails 12 and 12 and is connected to shoe brackets 18 and 18 fixed to the slide panel.

Figure 3:
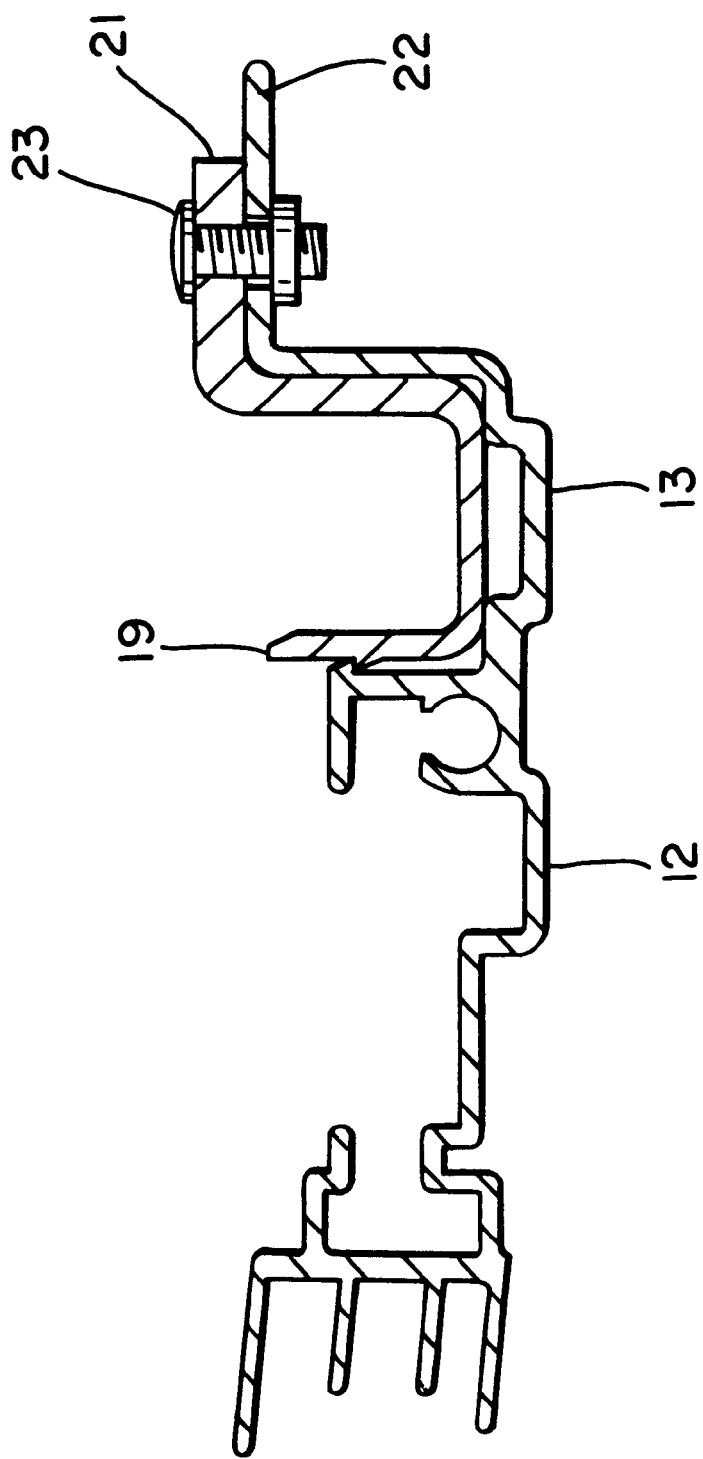
FIG. 3 is a cross sectional view of a fixing portion of a protruding portion between a gutter and the guide rail.
Figure 6:
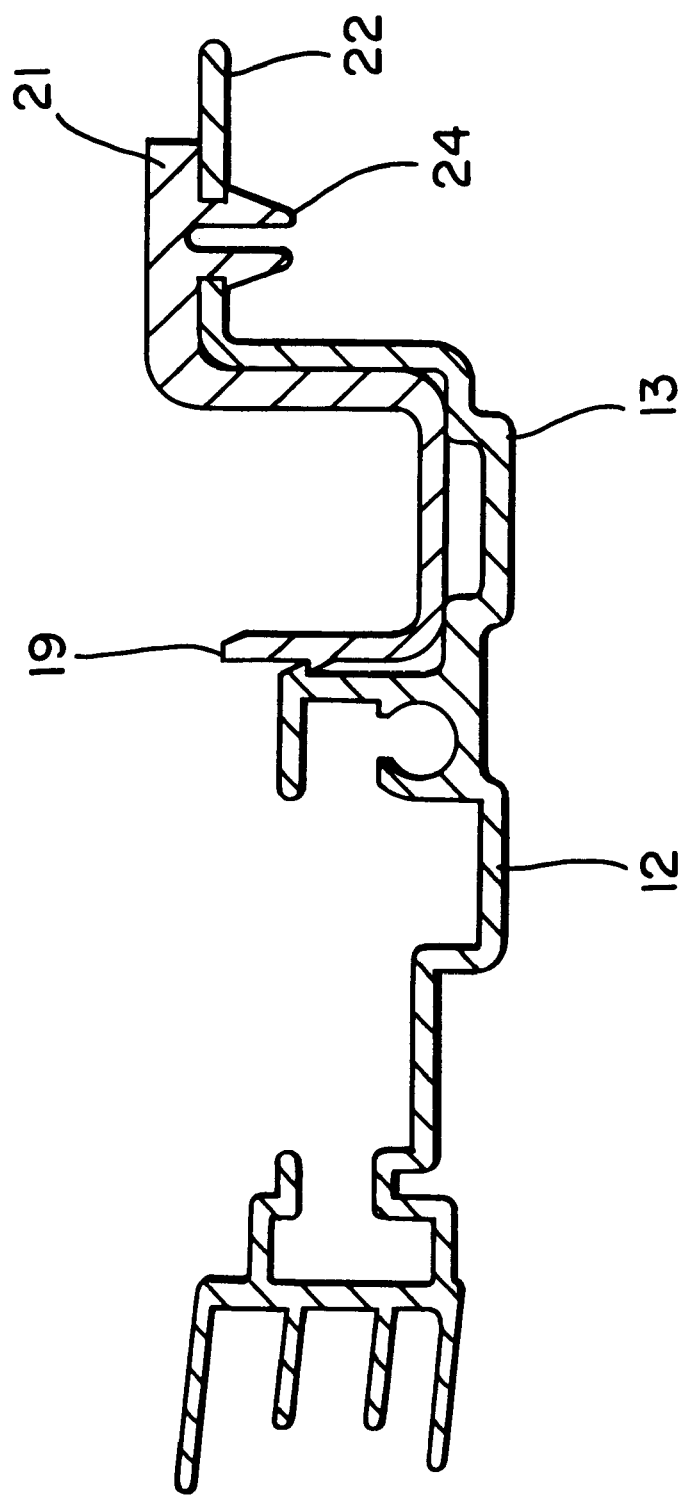
FIG. 6 is a cross sectional view which shows another embodiment of a mounting between the gutter and the guide rail.

The rear rail 15 may be provided in a side of the slide panel. The sliding roof apparatus 11 further has gutters 19 made of a synthetic resin and having a substantially U-shaped cross section. Front and rear ends of each gutter 19 are closed by walls, and pipes 20 for connecting drain hoses are fixed to the walls or near the walls of closing the front and rear ends of each gutter 19, so that a rain water within the gutter 19 can be discharged to an outer portion. A flange 21 protruding outwardly is provided at a proper portion on a side upper edge of the gutter 19, and the gutter 19 is fixed to the protruding portion 13 by fixing the flange 21 to a horizontal piece 22 of the protruding portion 13 by means of a screw 23 (refer to FIG. 3) or by press fitting a hook portion 24 integrally formed with the flange 21 to a hole in the horizontal piece 22 (refer to FIG. 6).

Figure 2:
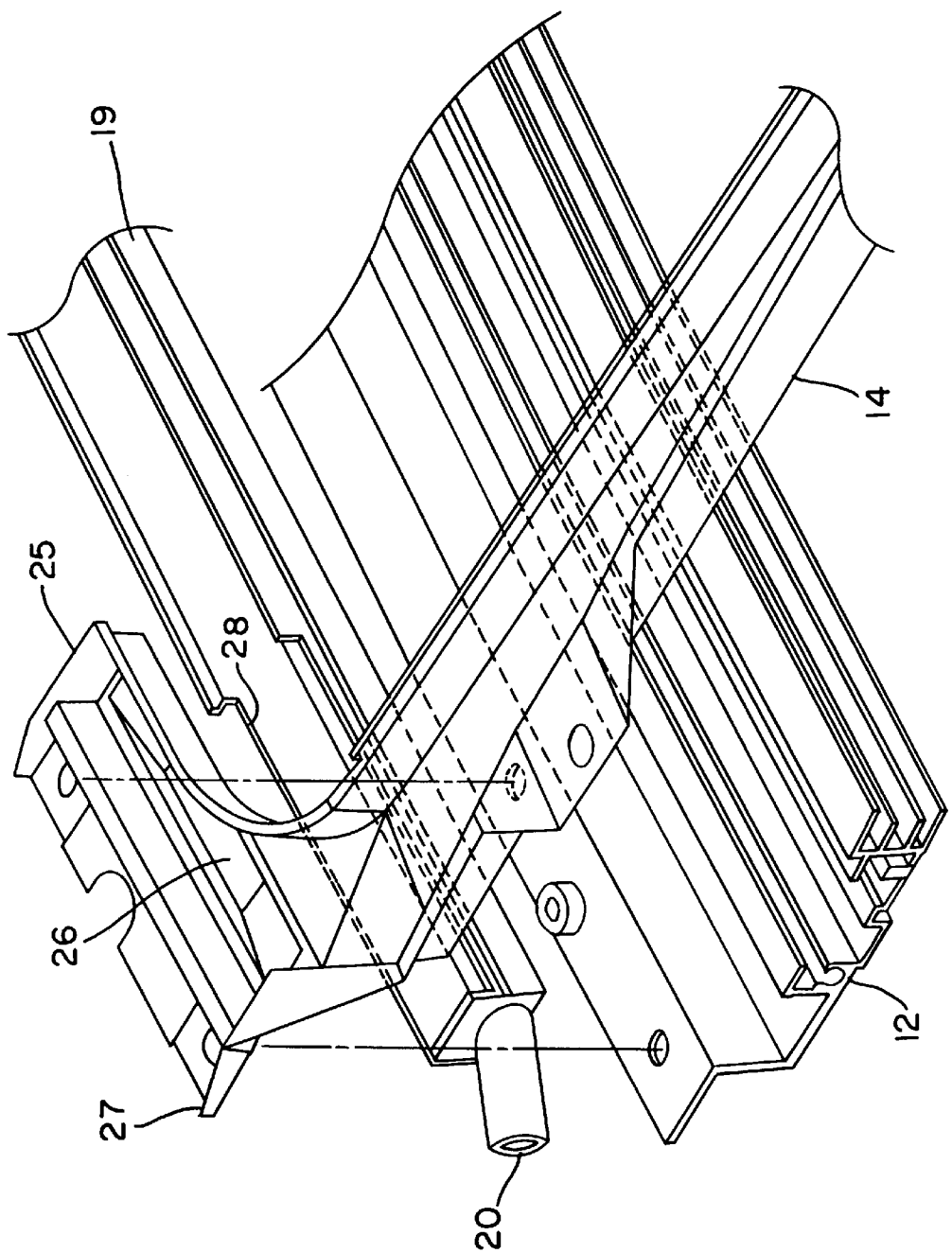
FIG. 2 is an exploded perspective view of a connection portion between a guide rail and a front rail.
Figure 4:
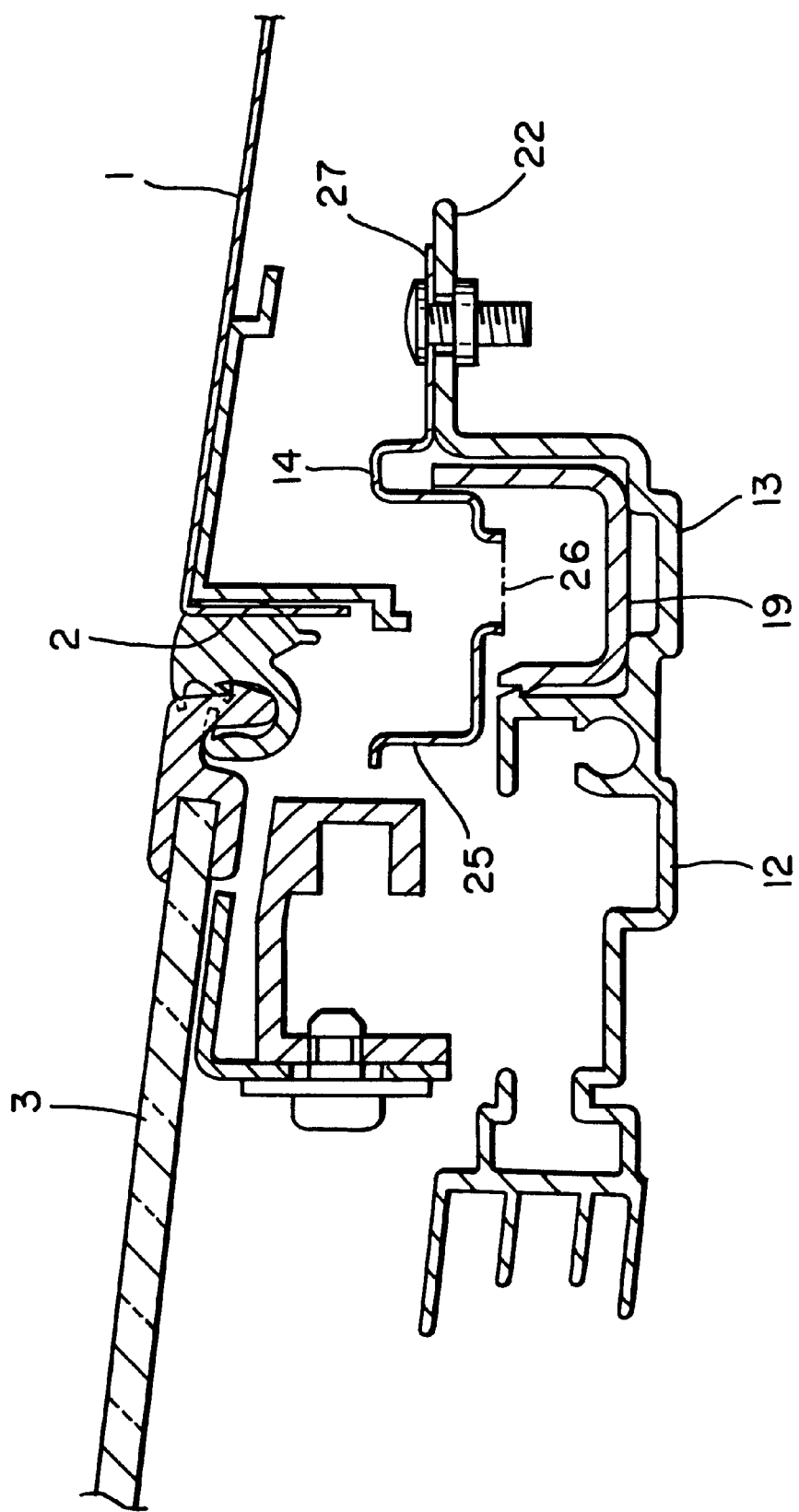
FIG. 4 is a cross sectional view which shows a relation between the front rail and the gutter.

A connection between the front rail 14 and the guide rails 12 will be described below with reference to FIGS. 2 and 4. The front rail 14 having a substantially U-shaped cross section comprises a front portion perpendicular to the pair of guide rails 12 and 12, and a pair of side end portions 25 along the guide rails 12 and 12. The front rail 14 is preferably made of an a luminum alloy or iron metals and has a substantially U-shaped cross section, both ends thereof are closed by the wall, it is structured such as to provide an opening 26 on a bottom wall of the side end portion 25, a bracket 27 is integrally formed with an upper edge of an outer side wall of the side end portion 25, the bracket 27 is screwed to the horizontal piece 22 of the extending portion 13, and the front rail 14 is fixed to the guide rails 12 and 12. At this time, both side end portions 25 and 25 of the front rail 14 are overlapped with front portions of the gutters 19 and 19 from the above, oppose the opening 26 with respect to the bottom wall of the gutters 19 and 19, flow out the rain water within the front rail 14 into the gutter 19 via the opening 26, and next discharge the rain water from the pipe 20.

The both side end portions 25 and 25 of the front rail 14 overlapped with the front portions of the gutters 19 and 19 are fitted to a notch 28 provided on the side wall of the gutters 19 and 19 so as to form a position in a longitudinal direction with respect to the gutters 19 and 19.

Figure 5:
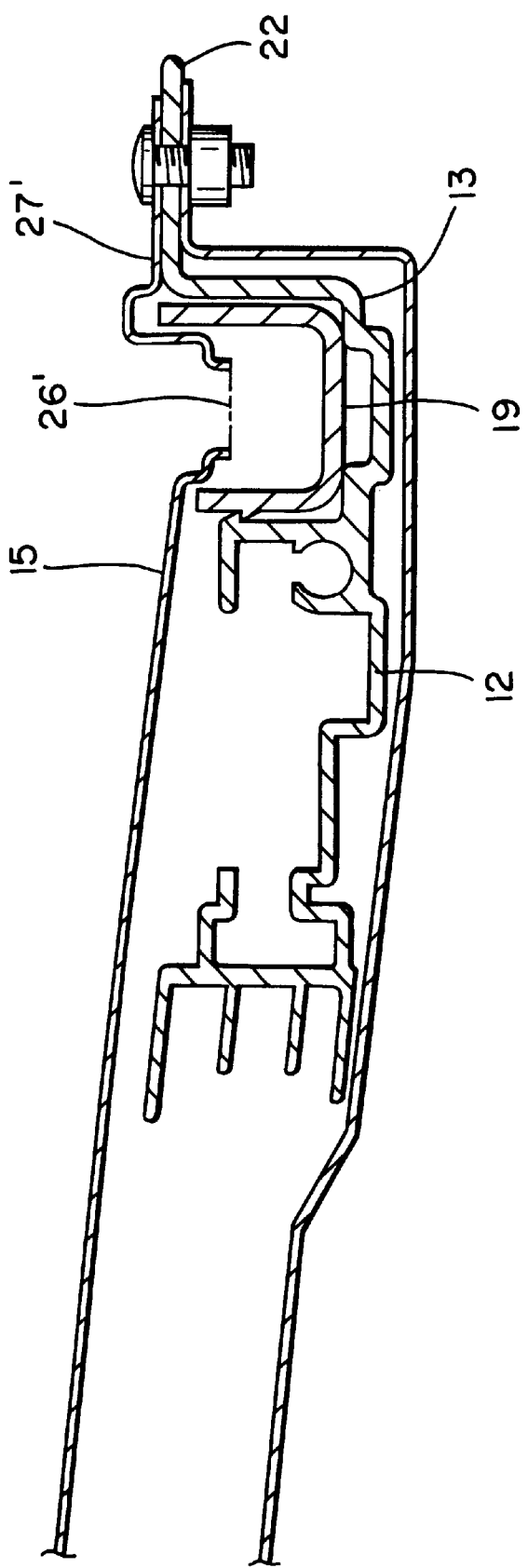
FIG. 5 is a cross sectional view which shows a relation between a rear rail and the gutter.

The rear rail 15 is preferably structured in the same manner as that of the front rail 14. Side end portions 25' and 25' in both sides thereof are fixed to a rear portion of the horizontal pieces 22 of the guide rails 12 and 12 via a bracket 27' (refer to FIG. 5). Openings 26' formed in the side end portions 25' and 25' of the rear rail 15 are opposed to the bottom wall of each gutter 19, and the rain water within the rear rail 15 is flown out into the gutters 19 from the openings 26', and next, is discharged to an outer portion via the pipe 20.

As mentioned above, the sliding roof apparatus 11 is structured by connecting a pair of guide rails 12 and 12 by the front rail 14. Accordingly, a rigidity can be secured, and the apparatus can be made in a compact, thin and light manner without using a large-sized housing.

As many apparently widely different embodiments of the present invention can be made without departing from the spirit and scope thereof, it is to be understood that the invention is not limited to the specific embodiments thereof except as defined in the appended claims.

What is claimed is:

1. A sliding roof apparatus comprising:
   a pair of guide rails arranged on both sides of a roof opening of a vehicle and in a longitudinal direction of the vehicle and having a protruding portion outwardly extending from an outer side surface thereof;
   gutters, each having a substantially U-shaped cross section and a pair of side walls, said gutters being supported to the protruding portion of the guide rail;
   a front rail having right and left end portions and a rain gutter portion, said right and left end portions of said front rail each having a substantially U-shaped cross section and an end portion, each of said end portions being closed by a wall, said right and left end portions of said front rail each being connected to a front end of one of said guide rails, said right and left end portions of said front rail being superimposed with respect to said side walls of each of the gutters and the openings of the front rail being formed on a bottom wall of the right and left end portions, said front rail supporting a drive mechanism of the sliding roof; and
   said right and left end portions of said front rail including openings that establish fluid communication between the rain gutter portion of the front rail and the gutters.

2. A sliding roof apparatus as claimed in claim 1, wherein the rear portions of the pair of guide rails are connected by a rear frame having a rain gutter portion to flow out rain water within the rear rail into the gutters.

3. A sliding roof apparatus as claimed in claim 1, wherein the protruding portion of the guide rails is provided with a substantially horizontal flange extending outwardly, and the gutter and the front rail are fixed to the flange.

4. A sliding roof apparatus as claimed in claim 1, wherein the gutter is made of a synthetic resin and the front rail is made of a light alloy or iron metals.

5. A sliding roof apparatus comprising:
   a pair of guide rails arranged on both sides of a roof opening of a vehicle and in a longitudinal direction of the vehicle and having a protruding portion outwardly extending from an outer side surface thereof;
   gutters, each having a substantially U-shaped cross section and supported to the protruding portion of the guide rail;
   a front rail having right and left end portions and a rain gutter portion. said right and left end portions of said front rail each being connected to a front end of one of said guide rails so that said rain gutter portion of said front rail overlaps said gutters from above, said front rail supporting a drive mechanism of the sliding roof;
   said right and left end portions of said front rail including openings that establish fluid communication between the rain gutter portion of the front rail and the gutters;
   wherein the protruding portion of the guide rails is provided with a substantially horizontal flange extending outwardly, and the gutter and the front rail are fixed to the flange; and
   wherein the front rail has a portion substantially perpendicular to the guide rail and said right and left end portions are substantially parallel to the guide rail, and said right and left end portions being fixed to the guide rail.

6. A sliding roof frame structure for vehicles having an opening in a roof thereof, the opening having opposed side walls, said sliding roof frame structure comprising:
   a pair of guide rails, each of which is positionable substantially parallel to one of the opposed side walls of the opening;
   protruding means formed integrally with each of the guide rails and extending laterally outwardly, said protruding means having a substantially U-shaped cross-section;

rain gutter means positioned in the protruding means for catching rain and flowing the rain outside, said rain gutter means having front ends possessing opposed side wall portions;

a front rail extending laterally and secured to an end of each guide rail, the front rail having side end portions which are superimposed with respect to the side wall portions of the front ends of the rain gutter means and having openings formed on bottom walls of the side end portions, said openings being directed to inside portions of the rain gutter means to flow out rain water within the front rail into the rain gutter means.

7. A sliding roof frame structure as claimed in claim 6, further comprising:

a rear rail extending laterally and secured to an end of each guide rail, the rear rail having side end portions which are substantially parallel to upper portions of rear ends of the rain gutter means and said rear rail has openings directed to the inside portions of the rain gutter means to flow out rain water within the rear rail into the rain gutter means.

* * * * *